(12) United States Patent
Kielb (10) Patent No.: US 11,220,428 B2
(45) Date of Patent: Jan. 11, 2022

(54) HYDROCARBON WAVE REFORMER AND METHODS OF USE

(71) Applicant: Standing Wave Reformer LLC, Newberry, FL (US)

(72) Inventor: Robert Kielb, Gainesville, FL (US)

(73) Assignee: New Wave Hydrogen, Inc.

( * ) Notice: Subject to any disclaimer, the term of this patent is extended or adjusted under 35 U.S.C. 154(b) by 621 days.

(21) Appl. No.: 15/885,453

(22) Filed: Jan. 31, 2018

(65) Prior Publication Data

US 2018/0215615 A1 Aug. 2, 2018

Related U.S. Application Data

(60) Provisional application No. 62/452,807, filed on Jan. 31, 2017.

(51) Int. Cl.
*C01B 3/24* (2006.01)
*C01B 32/15* (2017.01)
(Continued)

(52) U.S. Cl.
CPC ............ *C01B 3/24* (2013.01); *B01F 7/00591* (2013.01); *B01J 3/08* (2013.01); *B01J 19/0066* (2013.01); *B01J 19/18* (2013.01); *B01J 19/1806* (2013.01); *C01B 3/26* (2013.01); *C01B 3/50* (2013.01); *C01B 32/15* (2017.08); *C01B 32/16* (2017.08); *C01B 32/25* (2017.08); *C09C 1/48* (2013.01); *B01J 2219/00761* (2013.01);
(Continued)

(58) Field of Classification Search
CPC .... B01F 7/00591; B01J 19/0066; B01J 19/18; B01J 19/1806; B01J 2219/00761; B01J 2219/00779; B01J 3/08; C01B 2203/048; C01B 2203/049; C01B 2203/0883; C01B 2203/1241; C01B 2203/1247; C01B 2203/142; C01B 2203/148; C01B 2203/1628; C01B 32/15; C01B 32/16; C01B 32/25; C01B 3/24; C01B 3/26; C01B 3/50; C09C 1/48; Y02P 20/124
See application file for complete search history.

(56) References Cited

U.S. PATENT DOCUMENTS 2,832,665 A 4/1958 Hertzberg et al.
2,832,666 A 4/1958 Hertzberg et al.
(Continued)

FOREIGN PATENT DOCUMENTS

CA 2930838 5/2015
WO WO 2020/118417 6/2020

OTHER PUBLICATIONS

A Shocking New Pump, https/spinoff.nasa.gov/spinoff2000/ip3.htm, Apr. 8, 2012.
(Continued)

*Primary Examiner* — Anthony J Zimmer
*Assistant Examiner* — Syed T Iqbal
(74) *Attorney, Agent, or Firm* — Davidson Berquist Jackson & Gowdey, LLP (57) ABSTRACT

A method and system of using a type of wave rotor to reform a hydrocarbon fluid using pressure waves within the wave rotor to reformulate a hydrocarbon fluid, such as methane or the like, into a lighter hydrocarbon, hydrogen, or, in some instances, hydrogen, partially decomposed hydrocarbon fluid and carbon solids.

45 Claims, 9 Drawing Sheets

(51) Int. Cl.
| | |
|---|---|
| C09C 1/48 | (2006.01) |
| B01J 19/18 | (2006.01) |
| C01B 32/16 | (2017.01) |
| B01J 3/08 | (2006.01) |
| B01J 19/00 | (2006.01) |
| C01B 3/26 | (2006.01) |
| C01B 32/25 | (2017.01) |
| B01F 7/00 | (2006.01) |
| C01B 3/50 | (2006.01) |

(52) U.S. Cl.
CPC ........... B01J 2219/00779 (2013.01); C01B 2203/048 (2013.01); C01B 2203/049 (2013.01); C01B 2203/0883 (2013.01); C01B 2203/1241 (2013.01); C01B 2203/1247 (2013.01); C01B 2203/142 (2013.01); C01B 2203/148 (2013.01); C01B 2203/1628 (2013.01); Y02P 20/10 (2015.11)

(56) References Cited

U.S. PATENT DOCUMENTS

| | | | |
|---|---|---|---|
| 2,902,337 | A | 9/1959 | Glick et al. |
| 3,235,341 | A | 2/1966 | Hansel |
| 3,254,960 | A | 6/1966 | Hansel |
| 3,262,757 | A | 7/1966 | Bodmer |
| 3,272,598 | A | 9/1966 | Hansel |
| 3,307,917 | A | 3/1967 | Hansel et al. |
| 3,307,918 | A | 3/1967 | Bodmer et al. |
| 3,355,256 | A | 11/1967 | Hansel |
| 3,503,713 | A | 3/1970 | Hansel |
| 3,998,711 | A | 12/1976 | Hertzberg et al. |
| 5,300,216 | A | 4/1994 | Hertzberg et al. |
| 10,195,574 | B2 | 2/2019 | Bedard et al. |
| 10,384,180 | B2 | 8/2019 | Knowlen et al. |
| 2005/0072152 | A1 | 4/2005 | Suzuki et al. |
| 2010/0249468 | A1* | 9/2010 | Perkins ............ C10J 3/506 568/840 |
| 2011/0060178 | A1* | 3/2011 | Nafis ............ B01J 38/10 585/720 |
| 2013/0048486 | A1* | 2/2013 | Castillo ............ C10G 15/08 204/157.47 |
| 2014/0243569 | A1 | 8/2014 | Seppala et al. |
| 2014/0328749 | A1* | 11/2014 | Hammel ............ C01B 3/28 423/651 |

OTHER PUBLICATIONS

Akbari, P. et al., A Review of Wave Rotor Technology and Its Applications, Journal of Engineering for Gas Turbines and Power, Oct. 2006, vol. 128, pp. 717-735.
Akbari, P. et al., Review of Recent Developments in Wave Rotor Combusion Technology, Journal of Propulsion and Power, vol. 25, No. 4, Jul.-Aug. 2009, pp. 833-845.
J.E. Carpenter et al., An Existing Facility for SCRAMJET Testing—The Wave Superheater, AIAA Journal, pp. 1701-1702, 1967.
PCTUS2018016226—International Search Report and Written Opinion dated Mar. 28, 2018.
R. Kielb et al., Wave Rotors for Continuous, Vitiate-Free, High-Enthalpy Test Gas Generation, ACENT Laboratories LLC, Hampton, VA, Dec. 2014.
Wave superheated hypersonic tunnel; semiannual report No. AD-1345-W-7, by J.E. Carpenter, Cornell Aeronautical Laboratory, Buffalo, NY 1962.
Snyder, P. et al., "Assessment of a Wave Rotor Topped Demonstrator Gas Turbine . . . " ASME Paper 96-GT-41, International Gas Turbine . . . Birmingham, UK (Jun. 10-13, 1996).
Toulson, E., Schock, H., and Attard, W., "A Review of Pre-Chamber Initiated Jet Ignition Combustion Systems," SAE Technical Paper 2010-01-2263 (2010).
J.L. Lauer et al., "Continuous Shock Wave Reactor For Chemical Production and Reaction Studies," 22 Chem. Eng. Sci. 209-215 (1967).
P.H. Rose, "Potential Applications of Wave Machinery to Energy and Chemical . . . ," Proceedings of the 12th Int'l Symposium of Shock Tubes and Waves, Jerusalem, Israel (1979).
E.L. Klosterman et al., "The Use of an Unsteady Wave Chemical Reactor . . . Fuel Production," Proceedings of the 12th Int'l Symposium of Shock Tubes and Waves . . . , Israel (1979).
W.H. Christiansen et al., "Wave Machinery for Chemical Processing and High-Efficiency . . . ," Proceedings of the 20th Int'l Symposium on Shock Waves, Pasadena, CA (Jul. 1995).
Jurrian van der Dussen et al., "Design of a Process to Manufacture Ethylene From Ethane By Means of a Shock Wave Reactor," Delft Univ, of Technology (Jun. 2, 2006).
Marco W.M. van Goethem et al., "Ideal Chemical Conversion Concept for the Industrial Production . . . ," 46 Ind. Eng. Chem. Res. 4045-4062 (2007) (published on Web Oct. 13, 2006).
Erdin Kocak, "Embedding of Shock Wave Reactor in Thermal Cracking Process for Ethylene," Delft Univ. of Technology, Dept. of Chemical Technology and Material Science (May 2007).
A. Hertzberg, "Nitrogen Fixation for Fertilizers by Gasdynamic Techniques," Proceedings of the 10th Int'l Symposium on Shock Tubes, Kyoto, Japan (1975).
A.T. Mattick et al., "Shock-Controlled Chemical Processing," Proceedings of the 19th Int'l Symposium on Shock Waves, Marseille, France (Jul. 1993).
L. Nill et al., "Design of a Supersonic Steam Tunnel for Use As a Shock Wave Reactor," AIAA 95-0016, 33rd Aerospace Sciences Meeting and Exhibit, Reno, NV (Jan. 1995).
Robert K. Masse, "Fluid Dynamics of the Shock Wave Reactor," Ph.D Thesis, Univ, of Washington, (2000).
C. Knowlen et al., "Petrochemical Pyrolysis With Shock Waves," AIAA 95-0402, 33rd Aerospace Sciences Meeting and Exhibit, Reno, NV (Jan. 1995).
A.T. Mattick et al., "Pyrolysis of Hydrocarbons Using a Shock Wave Reactor," Paper 3800, 21st Symposium on Shock Waves, Great Keppel Island, Australia (Jul. 1997).
EP Appln. No. 18747576.9—Extended European Search Report dated Jan. 11, 2021.
Akbari, P. et al., Numerical Simulation and Design of a Combustion Wave Rotor for Deflagrative and Detonative Propagation, 42nd AIAA Joint Propulsion Conference, Jul. 2006.
Moshrefi, M. et al., Methane Conversion to Hydrogen and Carbon Black by DC-Spark Discharge, Plasma Chem Plasma Process (2012) pp. 1167-1168.
Akbari, P. et al., Review of Recent Developments in Wave Rotor Combustion Technology, Journal of Propulsion and Power, vol. 25, No. 4, Jul.-Aug. 2009 pp. 833-844.
Akbari, P., Nalim, M.R., and Müuller, N., "A Review of Wave Rotor Technology and Its Applications," ASME Journal of Engineering for Gas . . . vol. 128, No. 4, pp. 788-785 (1996).
Wilson, J. and Paxson, D.E., "Wave Rotor Optimization for Gas Turbine Topping Cycles," Journal of Propulsion and Power, vol. 12, No. 4, pp. 778-785 (1996).
Jones, S.M. and Welch, G.E., "Performance Benefits for Wave Rotor Topped Gas Turbine Engines," ASME, 41st Turbo Expo '96, Birmingham, UK (Jun. 10-13, 1996).
Zehnder, G. et al. "Comprex® Pressure-Wave Supercharging for Automotive Diesels . . . " SAE Technical Paper Series 840132, International Congress & Exposition, (Feb. 27-Mar. 2, 1984).
Akbari, P. et al., "Performance Enhancement of Microturbine Engines . . . " ASME Journal of Engineering for Gas Turbines and Power, vol. 128, No. 1, pp. 190-202 (2006).
Welch, G.E., Jones, S.M., and Paxson, D.E., "Wave Rotor-Enhanced Gas Turbine Engines," Journal of Engineering for Gas Turbines and Power, vol. 119, No. 2, pp. 469-477 (1997).

\* cited by examiner

| STREAM NUMBER | | 0 | 1 | 2 | 3 | 4 | 5 | 6 | 7 | 8 | 9 | 10 | 11 | 12 |
|---|---|---|---|---|---|---|---|---|---|---|---|---|---|---|
| | | INLET | PRE-HEATED | MIXED-PORT 2 | EXPANDED - PORT 3 | LP SLPIT | RE-COMPRESSED | HEATED | CRACKED CH4 | COOLED | SPLIT | TRANSPORT | HP SPLIT | HP RECIRC |
| Mole Fraction | | | | | | | | | MIXTURE | GAS | C(s) | C(s) | | |
| Methane | | 1.0000 | 1.0000 | 1.0000 | 1.0000 | 1.0000 | 1.0000 | 1.0000 | 0.1000 | 0.1000 | 0.0000 | 0.0000 | 1.0000 | 1.0000 |
| Hydrogen | | 0.0000 | 0.0000 | 0.0000 | 0.0000 | 0.0000 | 0.0000 | 0.0000 | 1.8000 | 1.8000 | 0.0000 | 0.0000 | 0.0000 | 0.0000 |
| Carbon (solid) | | 0.0000 | 0.0000 | 0.0000 | 0.0000 | 0.0000 | 0.0000 | 0.0000 | 0.9000 | 0.0000 | 0.9000 | 0.9000 | 0.0000 | 0.0000 |
| Total Flow | (kmol/hr) | 2,574 | 2,574 | 10,809 | 10,809 | 2,574 | 2,574 | 2,574 | 7,206 | 4,890 | 2,316 | 2,316 | 8,236 | 8,236 |
| Total Flow | (kg/hr) | 41,179 | 41,179 | 172,950 | 172,950 | 41,179 | 41,179 | 41,179 | 41,179 | 13,383 | 27,796 | 27,796 | 131,772 | 131,772 |
| Temperature | K | 288 | 920 | 700 | 262 | 262 | 287 | 700 | 1098 | 700 | 700 | 288 | 262 | 604 |
| Pressure | MPa | 3.10 | 2.95 | 2.86 | 0.107 | 0.104 | 0.145 | 0.114 | 1.000 | 0.2000 | 0.10135 | 0.10135 | 0.10366 | 2.948 |
| Density | kg/m^3 | 22.09478 | 6.12720 | 7.82357 | 0.78842 | 0.76470 | 0.97968 | 0.31514 | 0.301 | 0.095 | | | 0.765 | 9.366 |
| Enthalpy | kJ/kg | 856 | 2953 | 2073 | 831 | 831 | 884 | 2077 | 12039 | 7419 | | | 831 | 1577.4 |
| Entropy | kJ/kg-K | 4.74 | 8.40 | 7.33 | 6.37 | 6.38 | 6.40 | 9.00 | 48.03 | 47.68 | | | 6.38 | 6.80 |

| STREAM NUMBER | | 0 | 1 | 2 | 3 | 4 | 11 | 5 | 6 | 7 | 8 | 9 | 10 |
|---|---|---|---|---|---|---|---|---|---|---|---|---|---|
| Mole Fraction | | | | | | | | | | | | | |
| Methane | | 1.00 | 1.00 | 1.00 | 1.00 | 1.00 | 1.00 | 1.00 | 1.00 | 0.10 | 0.10 | 0.00 | 0.00 |
| Hydrogen | | 0.00 | 0.00 | 0.00 | 0.00 | 0.00 | 0.00 | 0.00 | 0.00 | 1.80 | 1.80 | 0.00 | 0.00 |
| Carbon (solid) | | 0.00 | 0.00 | 0.00 | 0.00 | 0.00 | 0.00 | 0.00 | 0.00 | 0.90 | 0.00 | 0.90 | 0.90 |
| Total Flow | kmol/hr | 15,243 | 15,243 | 15,243 | 15,243 | 2,960 | 12,283 | 2,960 | 2,960 | 8,287 | 5,623 | 2,664 | 2,664 |
| Total Flow | kg/hr | 243,880 | 243,880 | 243,880 | 243,880 | 47,355 | 196,525 | 47,355 | 47,355 | 47,355 | 15,391 | 31,965 | 31,965 |
| Temperature | K | 288 | 465 | 700 | 384 | 384 | 384 | 401 | 700 | 1094 | 475 | 475 | 288 |
| Pressure | MPa | 3.10 | 2.95 | 2.89 | 0.300 | 0.291 | 0.291 | 0.360 | 0.349 | 1.000 | 0.2000 | 0.10135 | 0.10135 |
| Density | kg/m^3 | 22.1 | 12.3 | 7.904 | 1.510 | 0.001 | 1.464 | 1.737 | 0.962 | 0.302 | 0.139 | | |
| Enthalpy | kJ/kg | 856 | 1312 | 2073 | 1110 | 1112 | 1110 | 1151 | 2077 | 11993 | 4927 | | |
| Entropy | kJ/kg-K | 4.74 | 6.00 | 7.32 | 6.70 | 10.30 | 6.72 | 6.71 | 8.43 | 47.99 | 43.39 | | |

HYDROCARBON WAVE REFORMER AND METHODS OF USE

CROSS-REFERENCE TO RELATED APPLICATION

This application claims the benefit of U.S. Provisional Application No. 62/452,807, filed Jan. 31, 2017.

TECHNICAL FIELD

The present invention relates to systems and methods for hydrocarbon fluid reforming, hydrogen generation, solid carbon formation and carbon capture. More specifically, this is a new and useful fluid reformer utilizing systems and methods which include wave rotors to promote thermal and/or catalytic decomposition of fluids.

BACKGROUND ART

Carbon Dioxide emissions are believed to be one of the leading contributors to global climate changes. As a result, research sectors, industry sectors and public policy sectors are racing to find ways to reduce the carbon footprint of humans, to help reduce, minimize, and even eliminate the carbon dioxide emissions from energy sources such as fossil fuels.

Hydrogen is one such fuel that is being used more prevalently today as a result of these attempts to reduce our carbon footprint. Hydrogen gas can be used to produce power with no negative impact on the environment, unlike power produced using fossil fuels.

Hydrogen can be produced using many methods, however the overwhelming majority of industrial hydrogen is generated using steam methane reforming Steam methane reforming is a process where methane and steam are heated until they react, reforming into hydrogen and carbon dioxide. The chemical reaction describing steam reforming of the hydrocarbon methane is:

Steam methane reforming is a well-developed and refined process that has become an industry standard. Notwithstanding, steam reforming has its draw backs. Most notably, it generates carbon dioxide which is currently vented to the atmosphere. Additionally, the energy required for the process is generated using hydrocarbon fuels, further adding to the carbon dioxide emission problem. A second drawback of the steam methane reforming process is that it consumes water (steam), which is becoming a valuable resource. In addition to the environmental impacts, the capital cost of steam reforming plants is prohibitive for small to medium size applications because the technology does not scale down well.

Thus, there remains a significant unmet need for providing an environmentally friendly, cost effective and scalable hydrogen production method. What is needed are better hydrogen production systems and methods.

SUMMARY OF INVENTION

Methods and systems for employing direct hydrocarbon reforming are described. Direct hydrocarbon reforming requires much less energy than steam methane reforming and can be configured for cost-effective hydrogen production that produces no carbon dioxide and consumes no water.

For comparison to steam methane reforming, the chemical equation describing direct methane reforming into hydrogen and solid carbon is:

Compared to steam methane reforming, the energy required for direct methane reforming is less, no carbon dioxide is generated, no water is consumed and the carbon, which forms into a solid form is readily collected and can be a secondary product. Direct hydrocarbon reforming can solve many unmet needs in hydrogen production.

Methods for employing a wave rotor for hydrocarbon fluid reforming are provided. Some of the methods include providing a fluid supply to the input of a wave rotor having an inlet and an outlet, heating the hydrocarbon fluid using pressure waves in one or more stages, decomposing the hydrocarbon fluid as a result of the heating. In some embodiments the reforming process further includes separating the reformed fluid from the working fluid, holding the reformed fluid at a certain state, and/or separating the reformed fluid into its solid and fluid constituents.

Systems employing a wave rotor for hydrocarbon reforming are also provided. Exemplary systems include, at least, a pressurized hydrocarbon fluid, a wave rotor, a fluid solid separator, and a means for collecting the reformed fluid.

The hydrocarbon wave reformer has unique properties including those that allow for continuous, efficient and scalable hydrocarbon thermal decomposition with or without a catalyst. The wave reformer is a "cold wall" reformer where the energy for heating and reforming the working fluid comes from a pressure-driven energy exchange process onboard the rotor. This is a benefit of the wave reformer over current direct hydrocarbon reforming methods because there is nothing in the reformer to foul, allowing for continuous operation. Additional benefits over current reformers are lower energy consumption and better scalability.

BRIEF DESCRIPTION OF DRAWINGS

FIGS. 1A and 1B provide representations of inventive wave reformers.

FIGS. 2A through 2C provides representations of closed loop systems.

DESCRIPTION OF EMBODIMENTS

Wave rotors provide a unique solution to the hydrocarbon reforming industry. A wave rotor designed to reform hydrocarbon fluids (gases and liquids) into primarily hydrogen and solid carbon as well as lesser amounts of lighter hydrocarbons is described. The wave reformer uses pressure waves to heat and reform a fluid onboard a rotor. Thus, the systems described provide a continuous scalable system which requires little outside energy input to produce a reformed gas. The systems and methods further provide a secondary benefit of solid carbon production. Finally, the systems and methods described do not create additional CO2 gas that needs to be captured and/or sequestered as a result of the reforming process nor do they consume any water.

The following detailed description is merely exemplary in nature and is in no way intended to limit the scope of the invention, its application, or uses, which may vary. The invention is described with relation to the non-limiting definitions and terminology included herein. These definitions and terminology are not designed to function as a limitation on the scope or practice of the invention, but are presented for illustrative and descriptive purposes only.

Various terms used throughout the specification and claims are defined as set forth below as it may be helpful to an understanding of the systems and methods described.

As used herein "fluid" shall mean any liquid, gas, or plasma or combination of phases that has the ability to flow. A "fluid" may also contain some amount of solid or particulate mixed within the liquid, gas, or plasma or combination of phases.

As used herein a "wave rotor" shall mean a device that exchanges energy onboard a rotor using pressure waves. Wave rotors can be of various designs including for example, axial or radial design. The pressure waves onboard the rotor can be generated by port openings and closings as well as combustion and/or phase change onboard the rotor. Wave rotors are further described in Kielb, R., Castrogiovanni, A. and Voland, R., "Wave Rotors for Continuous, Vitiate-Free, High-Enthalpy Test Gas Generation", JANNAF APS, December 2014, which is incorporated herein by reference.

As used herein a "wave reformer" is a system utilizing a wave rotor for reforming a hydrocarbon fluid. As used herein, the term "hydrogen fluid" shall be understood to mean decomposed fluid constituents which contain hydrogen.

As used herein "fluid constituents" shall mean decomposed fluids, un-decomposed fluids, hydrogen fluid, suspended solids, and mixtures or combinations thereof.

As used herein "hydrocarbon" shall mean any compound or natural gas consisting entirely of, or substantially of, hydrogen and carbon bonded molecules. In addition, a hydrocarbon may alternatively include any mixture of fluids that include any amount of molecules containing hydrogen and carbon bonded atoms which may be mixed with other fluids or molecules whether or not such other fluids and molecules contain any carbon bonded molecules.

As used herein "working fluid" shall refer to any fluid onboard the rotor which goes through a compression or expansion process.

As used herein "reformed fluid" shall refer to the fluid which has been converted, cracked or reformed into lighter constituents than the original fluid.

Systems and methods for wave reforming a hydrocarbon fluid using a wave rotor are described.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

System

A system for providing hydrocarbon fluid reforming is provided. The system includes at least a high pressure hydrocarbon supply, at least one wave rotor having at least one inlet port and at least one outlet port, and a separator for separating the reformed fluid exhausted from the outlet port into its solid and fluid constituents.

It is appreciated that many hydrocarbon fluids are known in the art. Without intending to limit the invention, a hydrocarbon fluid may include for example, methane, ethane, propane, butane, pentane, hexane, heptane, octane, nonane, docane, or any alkane, alkene, alkyne, cycloakane, alkadiene, or other variations related thereto.

The wave rotor may be an axial or radial type wave rotor. Additionally, the wave rotor can be designed to input energy to the flow (wave-compressor), extract energy from the flow (wave-turbine) or to minimize the shaft power required (wave-rotor). It is appreciated that the wave rotor may move at various speeds. In some embodiments the wave rotor rotates within a range of 10 to 30,000 RPM.

In at least one embodiment a settling chamber is used as an output from the wave rotor. The settling chamber is intended to increase the time of the fluid at high temperature to promote additional thermal decomposition of the reformed hydrocarbon fluid.

It is appreciated that many heat losses are produced in the system, thus in at least some embodiments, one or more heaters or heat exchangers may be used to maximize thermal decomposition. In some embodiments, one or more regenerative heat exchangers are used to reuse heat generated by the system for pre-heating or re-heating hydrocarbon fluids in the system. In some embodiments, a heater using additional energy from an external source is employed to re-add heat losses to the system. It is appreciated that heat is lost through thermal expansion of a compressed fluid. It is further appreciated that heat is generated as a result of fluid compressions, either as a result of the wave rotor, or any compressor which may be employed in or with the system. An exemplary use of a regenerative heat exchanger is to pre-heat incoming hydrocarbon fluids to be reformed with outgoing reformed fluids. In an alternative exemplary use, regenerative heat exchangers are employed for reheating fluids between stages or cycles of the wave rotor.

Some embodiments may optionally include one or more compressors to both increase the system pressure of a fluid, and to add additional heat losses to the system. In at least one embodiment, a portion of hydrocarbon supply exhausting from at least one outlet port of said wave rotor is supplied to a second inlet port of the wave rotor to be driven (or heated) by the expansion of the incoming hydrocarbon fluid supply in the first stage of the wave rotor.

In some embodiments, the system optionally includes one or more control heaters. As discussed previously these heaters may be regenerative heat exchangers or heaters powered from an external energy source. In such embodiments, a pre-heater is optionally used for pre-heating the compressed hydrocarbon supply (the driven fluid) prior to supplying to the second inlet port of the wave rotor.

In some embodiments, a method for introducing reaction catalyst to the hydrocarbon fluid prior to supplying the said fluid to the wave rotor is included.

In some embodiments, a solid carbon transport system is employed for transporting the separated carbon as a result of the reforming process from the separator to.

In some embodiments, a catalytic carbon separator for assisting in the separation and processing of the transported solid carbon is provided.

Figure 1A:
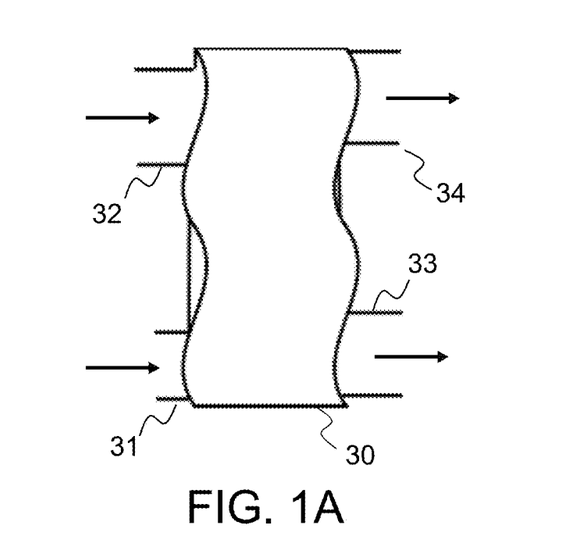
FIG. 1A is an exemplary embodiment of a wave reformer that is a pressure driven wave reformer which uses a wave rotor to reform a supplied fluid using a high pressure working fluid, causing compression heating of the supplied fluid on onboard the wave rotor.
Figure 1B:
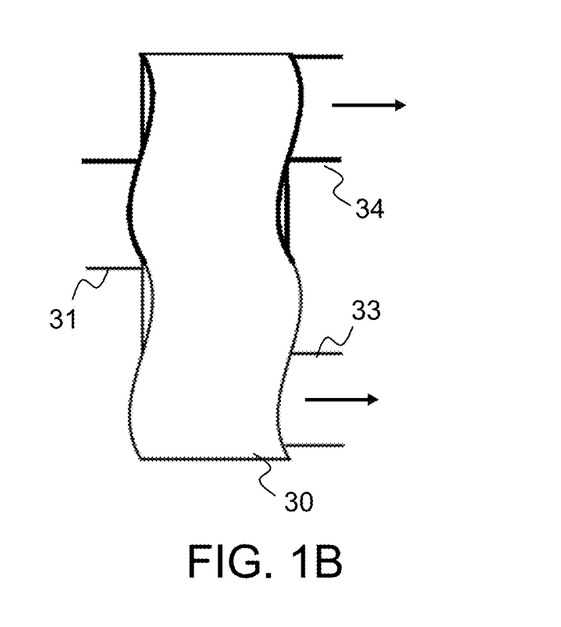
FIG. 1B is an exemplary embodiment of a wave reformer which uses energy release or phase change to provide compression heating to the supplied fluid on board the rotor.

FIGS. 1A and 1B are representations of inventive wave reformers. FIG. 1A provides for one embodiment of a wave reformer that is a pressure driven wave reformer which uses a wave rotor to reform a supplied fluid using a high pressure working fluid, causing compression heating of the supplied fluid on onboard the wave rotor. FIG. 1B provides for another embodiment of a wave reformer which uses energy release or phase change to provide compression heating to the supplied fluid on board the rotor.

Figure 2A:
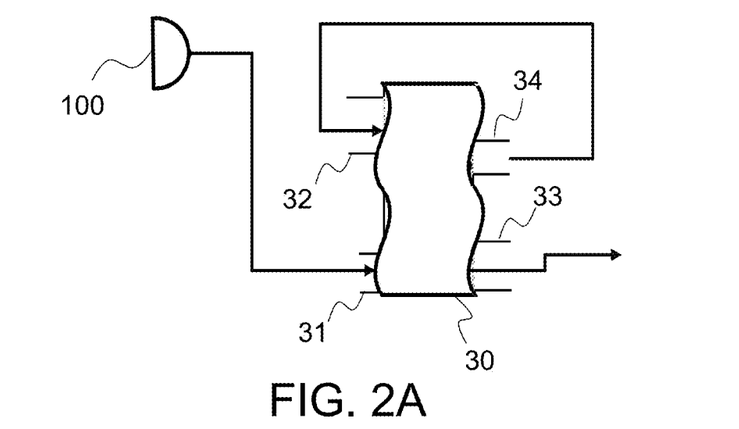
FIG. 2A is an exemplary embodiment of a closed loop wave reformer system which includes a fluid supply being supplied to one wave reformer inflow port of the wave reformer.
Figure 2B:
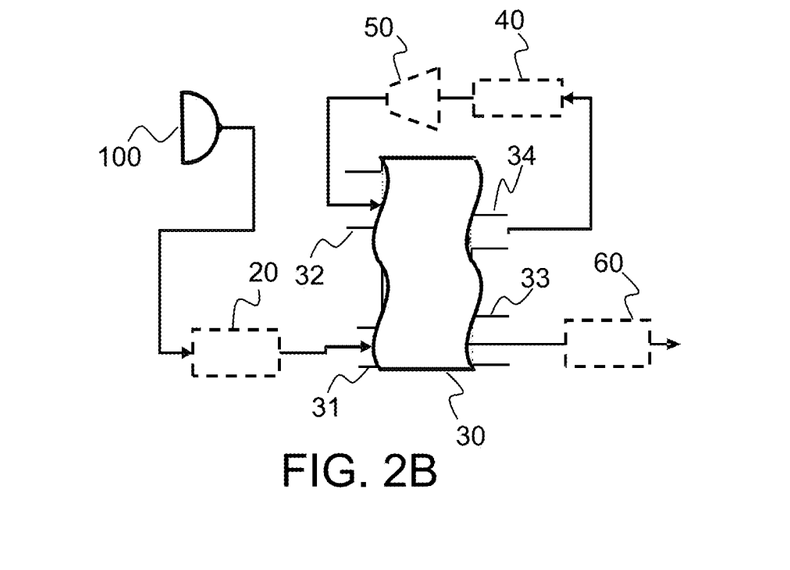
FIG. 2B represents a different embodiment of the closed loop system which further includes a heater and/or a fan/compressor for adding additional energy to the working fluid in the reforming process.

FIGS. 2A-2B provides representations of closed loop systems. FIG. 2A provides at least one embodiment of a closed loop wave reformer system which includes a 100 fluid supply being supplied to one 31 wave reformer inflow port of the 30 wave reformer. In this embodiment, the working fluid is exhausted from at least one 33 wave reformer outflow port. The working fluid exhausted from the 34 outflow port is redirected back to another 32 wave reformer inflow port where it is converted from a working fluid to a reformed fluid on board the rotor, and eventually exhausted as a reformed fluid from the 33 outflow port. FIG. 2B represents a different embodiment of the closed loop system which further includes a 40 heater and/or a 50 fan/compressor for adding additional energy to the working fluid in the reforming process. FIG. 2B further illustrates a 20 pre-heater to the 100 incoming fluid supply to the 30 wave reformer and an optional 60 settling chamber. It is appreciated that some or all of the additional components may be added to the system of FIG. 2A depending on the use and specifications of the desired system.

Figure 3A:
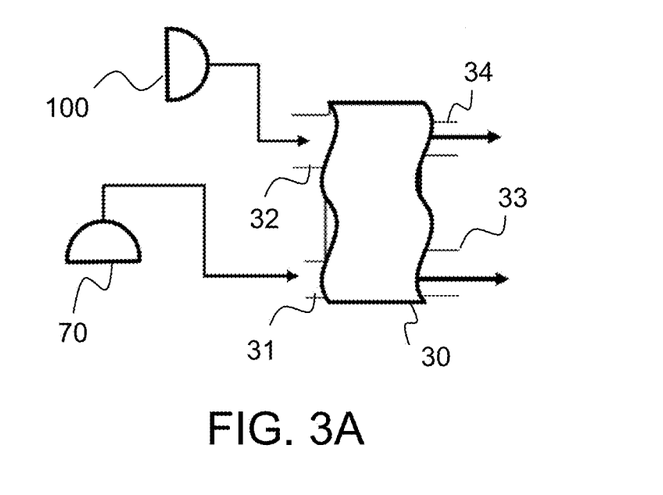
FIG. 3A shows a fluid supply directed to an inflow port of a wave reformer.
Figure 3B:
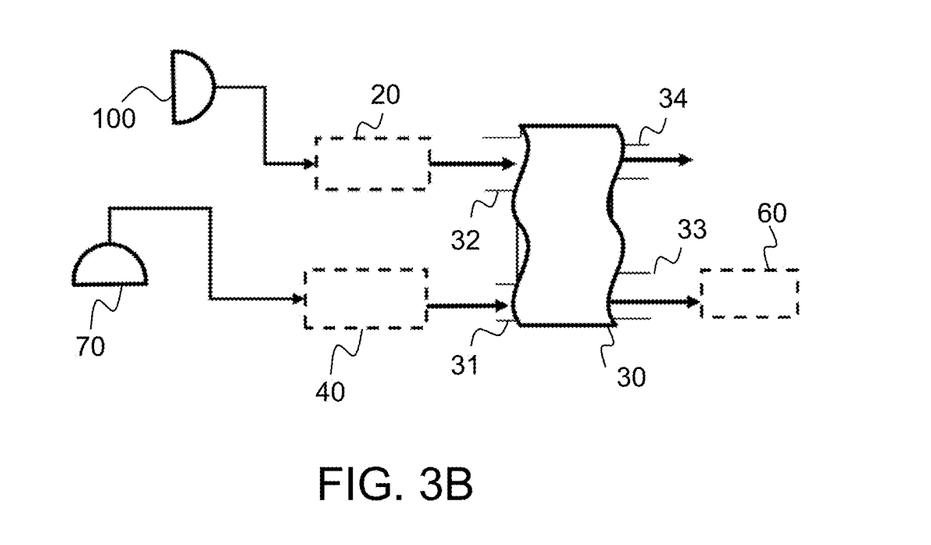
FIG. 3B provides alternative embodiments of a closed loop system which optionally includes one or more heaters to add energy to the system, or at least one settling chamber.

FIGS. 3A-3B provides representations of open loop wave reforming systems. FIG. 3A provides that a 100, 70 fluid supply be directed to an inflow port 31, 32 of a wave reformer 30. Either of the 100, 70 may be a working fluid and a driven fluid. After reforming the working fluid the driven fluid and the reformed fluid are exhausted from the 33, 34 outflow ports from the 30 wave reformer. The Driver fluid is exhausted to atmosphere or may be reprocessed as preferred, while the driven fluid is reformed on board the rotor and exhausted. FIG. 3B provides alternative embodiments of a closed loop system which optional includes one or more 20, 40 heaters to add energy to the system, or at least one 60 settling chamber to increase the time of the fluid at high temperature to promote additional thermal decomposition of the reformed fluid. It is appreciated that some or all of the additional components may be added to the system of FIG. 3A depending on the use and specifications of the desired system.

Figure 4:
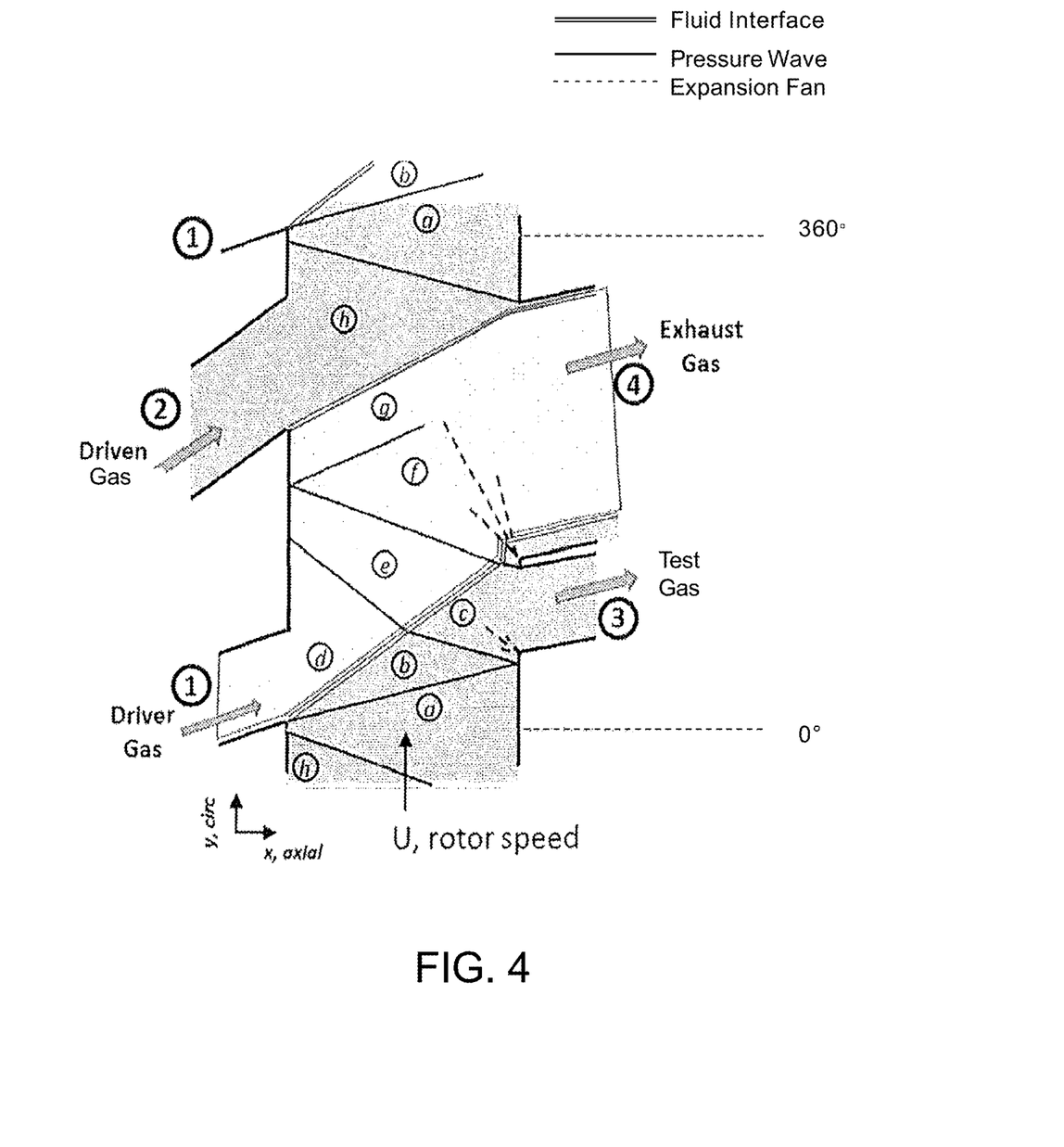
FIG. 4 provides a typical wave cycle for a compression-driven heating cycle that is known in the wave heating art.

FIG. 4 provides a typical wave cycle for a compression-driven heating cycle that is known in the wave heating art. The driver gas, driven gas, test gas and exhaust gas are depicted. The schematic representation shows pressure waves.

Figure 5:
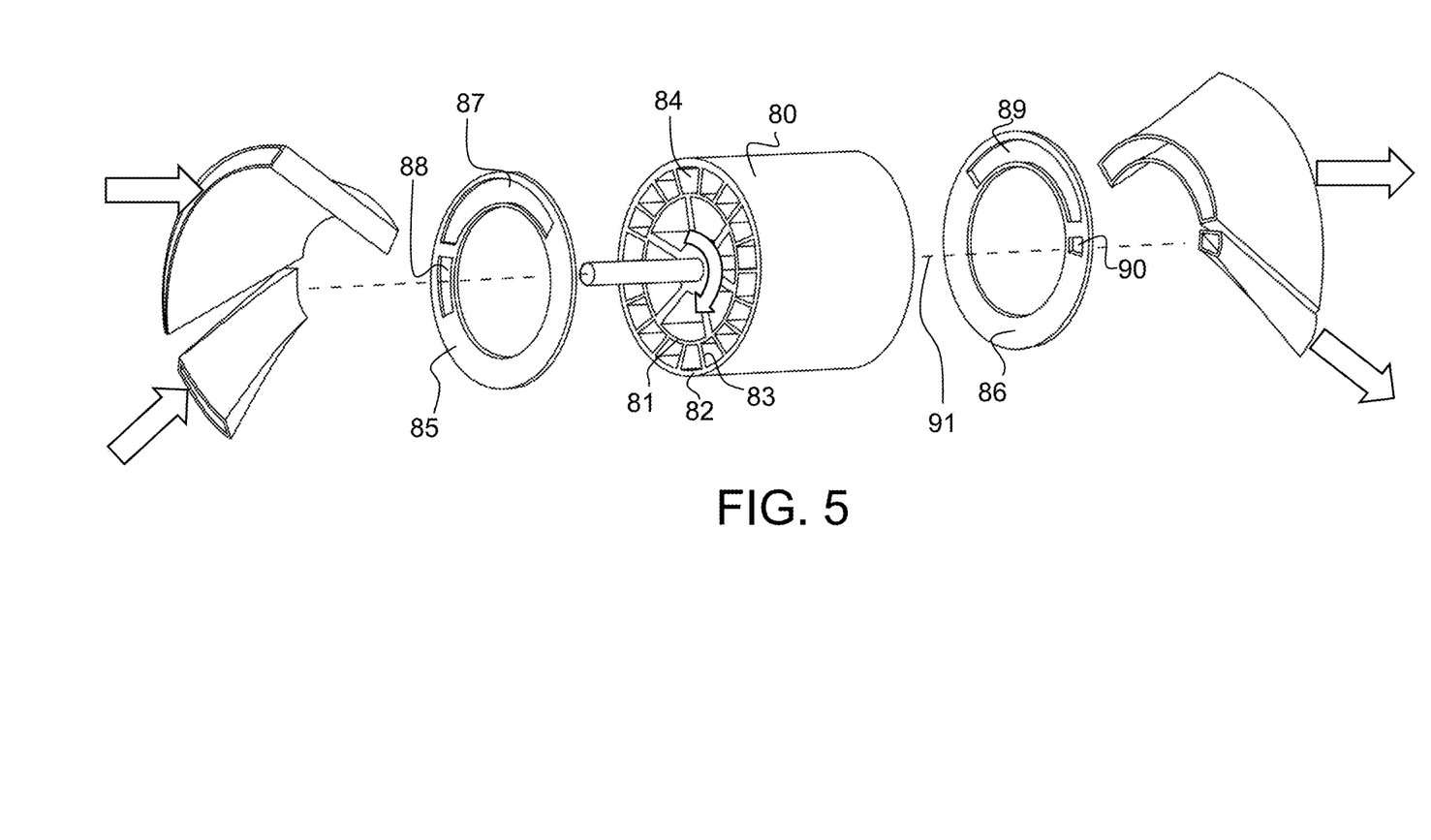
FIG. 5 provides at least one illustration of a wave rotor known in the fuel heating art.

FIG. 5 provides at least one illustration of a wave rotor known in the gas heating art. Wave rotors are a class of devices that use pressure waves to exchange energy between one or more fluids onboard the rotor. FIG. 5 illustrates a wave rotor 80, having a hub 81, a tip-shroud 82, and a series of vanes 83 that connect the hub and tip-shroud, 81 and 82, respectively, to form a series of passages or channels 84 within the rotor. Stationary end plates 85 and 86, having ports 87 and 88, and 89 and 90 are located adjacent to the rotor at either end. As the rotor turns, the ends of the channels are either exposed to a port or the end-plate wall. As such, the end-plate/rotor combination operate like a set of fast-acting valves permitting fluid flow when a channel is exposed to the port (open) versus when a channel is exposed to the port (closed). Flow (indicated by arrows) and pressure in ports provide boundary conditions that can be used to create useful wave cycles, such as a fluid heating cycle, onboard the wave rotor 80. The creation and use of pressure waves onboard a wave rotor 30, such as that described in FIG. 5, are known methods of heating a fuel, such as a hydrogen gas, to obtain hydrogen gas at a much higher temperature (heater). The wave rotor 80 of FIG. 5 rotates around rotor axis 91 at a speed set by an external electric motor (not shown).

EXAMPLES

It is to be understood that while the invention has been described in conjunction with the detailed description thereof, the foregoing description is intended to illustrate and not limit the scope of the invention, which is defined by the scope of the appended claims Other aspects, advantages, and modifications are within the scope of the following claims Examples Closed Loop A closed-loop system for providing hydrocarbon fluid reforming is provided as illustrated in FIG. 2A. In one example, the 100 fluid to be reformed is methane and is brought from a 100 fluid supply being supplied to one 31 wave reformer inflow port of the 30 wave reformer. The working fluid is exhausted from at least one 34 wave reformer outflow port. The working fluid exhausted from the 34 outflow port is redirected back to another 32 wave reformer inflow port where it is converted from a working fluid to a reformed fluid on board the rotor, and it is eventually exhausted as a reformed fluid from the 33 outflow port.

The flow from the 33 outflow port is optionally directed into a 60 settling chamber to maintain the hydrocarbon fluid at the high temperatures to improve the thermal decomposition of the hydrocarbon gas and further complete the reforming process. Upon completion of the desired reforming process, the flow is directed to the separation stage where the gaseous, solid and optionally liquid states are separated for downstream processing or use.

FIG. 2B is an example of a closed-loop system with additional components than the example of FIG. 2A.

Figure 2C:
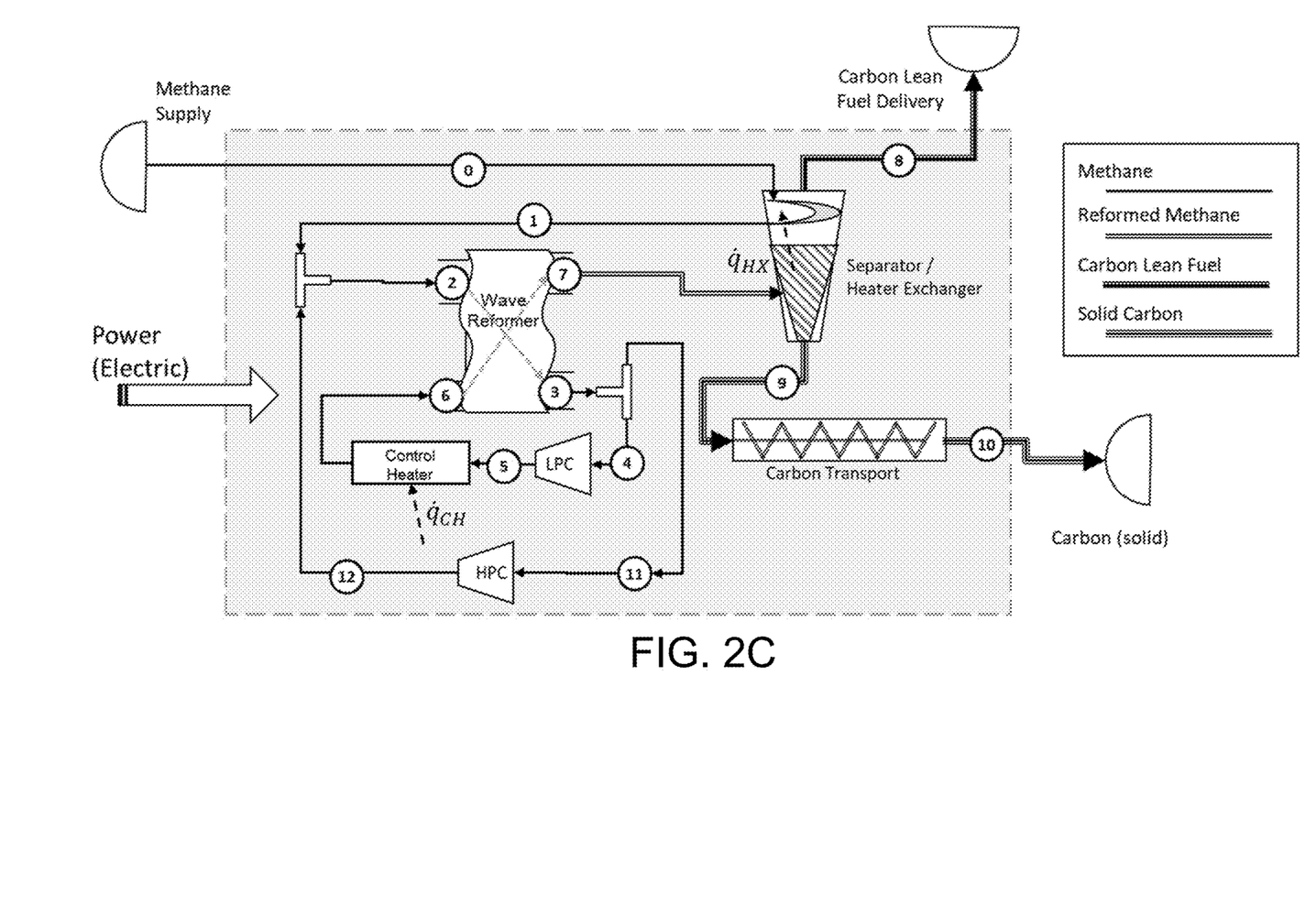
FIG. 2C is a schematic for a closed loop wave reformer system.

FIG. 2C is a schematic of another more specific example of closed-loop wave rotor hydrocarbon forming system and method. The closed-loop system of FIG. 2C is an example of the system integration for Natural Gas Decarbonization (NGD). The purpose of NGD is to remove carbon from Natural Gas (NG), which is generally at least 95% methane ($CH_4$). For that reason, the system below assumes the working fluid enters as 100% methane. The system outlined removes 90% of the carbon. The percentage of carbon removed is a design choice.

The system model described below is based on the FIG. 2C schematic. The model includes all the components inside the dashed box, which is the control volume for the model. The schematic shows the mass flows that cross the control volume boundaries at states 0 (fuel inflow), 8 (carbon-lean fuel outflow) and 10 (carbon black outflow). What is not shown crossing the control volume in the schematic is the energy input required to drive the Low-Pressure Compressor (LPC), High-Pressure Compressor (HPC), Control Heater (CH), Carbon Transport (CT) and Wave Reformer (WR). The power required for each component is determined as part of the system modeling.

The system model revolves around determining the thermodynamic state of the fluid at each of the indicated state points, 0 through 12. To accomplish this task, it is necessary to assume the performance of each component. Additionally, the working fluid is simplified from natural gas, which is about 95% methane, to 100% methane. This was done for simplicity as the model was developed. The use of the REFPROP package allows for conversion to a representative natural gas mixture with little to no other model changes. A complete list of model assumptions is presented below:

The model assumes a 24-hour day
The incoming fuel stream is 100% methane
The methane decomposes, or cracks, into only hydrogen and solid carbon
The compression processes use 90% isentropic efficiency
The heat exchangers have a gas 5% pressure drop and a thermal efficiency of 90%
The mixing and splitting junctions have a 3% pressure drop and are adiabatic
The solid particle separation process has a 15% pressure drop on the gas side
The solid particles exit the separator at atmospheric pressure
The fuel supply is delivered at 31 bar (450 psia) and 273 K (59° F.)
The NIST REFPROP v9.1 property package is used for fluid properties
The NASA Chemical Equilibrium with Application (CEA) equilibrium chemistry model to determine thermal cracking As shown in FIG. 2C, the fuel inflow (state 0) is routed to a pre-heater where it picks up heat from the high-temperature carbon lean fuel. The pre-heated fuel (state 1) is mixed with recirculated fuel (state 12) from the high-pressure recirculation loop, the resulting flow (state 2) is routed into the wave reformer high-pressure duct. This flow is expanded on-board the wave reformer and then routed to the wave reformer low-pressure exhaust duct, which feeds both recirculation loops. There is no reformed or high-temperature fuel routed to the recirculation loop, so carbon build up is not anticipated at either recirculation loop.

The low-pressure recirculation loop is heated to a predetermined temperature and routed to the low-pressure inlet duct of the wave reformer. This is the fuel that will be reformed on-board the wave reformer. This fuel is then routed out the wave reformer high-pressure exhaust duct which feeds the solid/gas separator. The flow from the separator is then delivered to its end use location. An overview of each of the state points on the schematic is given in Table 1 below.

TABLE 1

SWR System Flow Diagram State Point Description

| # | Description | Notes |
|---|---|---|
| 0 | Methane (Natural Gas) Supply | |
| 1 | Pre-Heated Methane | The methane is preheated using the heat content in the hot gas cracked products |
| 2 | High Pressure Wave Reformer Inflow | This stream is a mixture of the incoming and recirculated fuel. The high-pressure stream drives the process onboard the wave reformer |
| 3 | Low Pressure Wave Reformer Outflow | This stream is the expanded high-pressure flow from Port 2. It is split into two separate recirculation streams, 4 and 11. |
| 4 | Low Pressure Compressor Inflow | This stream is the inflow to the low-pressure recirculation loop. The LPC is designed to handle the low-pressure recirculation flow |
| 5 | Control Heater Inflow | This stream is the inflow to the control heater, which is included in the low-pressure recirculation loop. The control heater sets the temperature of the fuel to be reformed to the appropriate value as it enters the wave reformer. |
| 6 | Low Pressure Wave Reformer Inflow | This stream is the low pressure warm fuel to be reformed onboard the wave reformer |
| 7 | High Pressure Wave Reformer Outflow | This stream is the high-pressure high-temperature reformed fuel which is routed to the solid carbon separator |
| 8 | Reformed Gas Outflow | This stream is the reformed gas stream exiting the separator, thus the solids have been separated out. It is the carbon lean fuel that will be delivered to the end user |
| 9 | Solid Carbon Outflow | This stream is the solid carbon stream exiting the separator. This stream is feed the solid carbon transport system |
| 10 | Solid Carbon Delivery to Storage | Conveyor belt transport to storage or delivery |
| 11 | High Pressure Compressor Inflow | High-pressure recirculation loop required to provide required mass flow to set up a periodic wave pattern for the reforming process |
| 12 | High Pressure Recirculation to Wave Reformer | HPC pressure ratio size to match fuel inflow pressure |

Figure 2D:
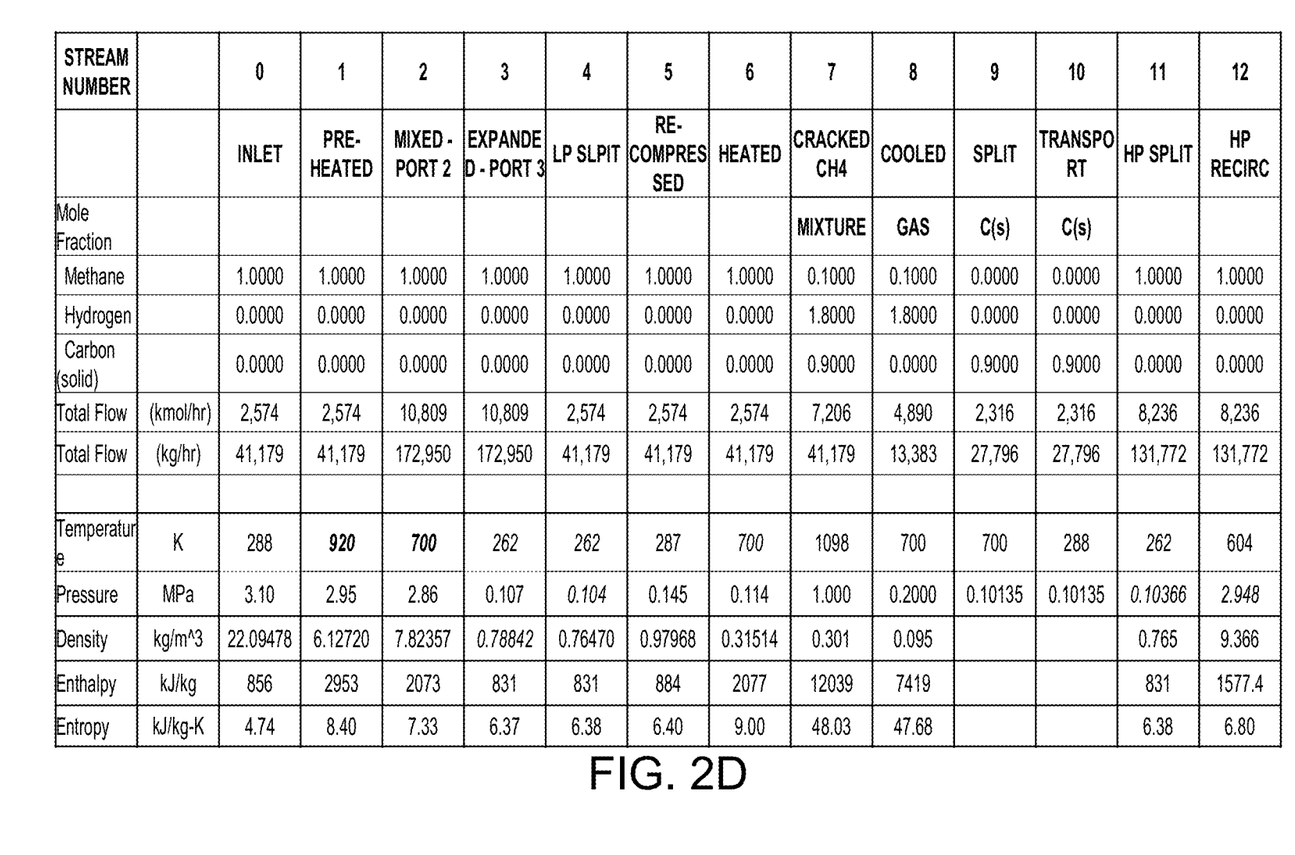
FIG. 2D is a chart of data measured at state points for a closed loop wave reformer system FIGS. 3A and 3B provide representations of open loop wave reforming systems.

A summary stream table is presented in FIG. 2D, the stream numbers correspond to the locations shown on the FIG. 2C schematic. In particular, FIG. 2D shows mole fraction, total flow, temperature, pressure, density, enthalpy, and entropy for each closed loop state point 0 through 12.

Examples Open Loop

An open-loop system for providing hydrocarbon fluid reforming is illustrated in FIG. 3A. In this example, there are two different working fluids, a driver fluid and a driven fluid. The driver fluid is routed from a 70 pressurized supply into the 31 inflow port of the 30 wave reformer. The driver fluid, which expands onboard the rotor, exits the rotor through a port 34 and can then be routed to a downstream process or vented to the atmosphere.

The driven fluid, which is the hydrocarbon fluid to be reformed, is brought in from a 100 pressurized supply. The driven fluid enters the wave reformer through inflow port 32. This fluid is then compressed and heated onboard the rotor prior to exiting the rotor through the outflow port 33. The reformed fluid, is routed for downstream processing that depends on the desired final product.

FIG. 3B is an alternative embodiment of a closed loop system which includes three optional or additional components, a first heater 20, a second heater 40 to add energy to the system, and/or at least one 60 settling chamber to increase the time of the fluid at high temperature to promote additional thermal decomposition of the reformed fluid.

Figure 3C:
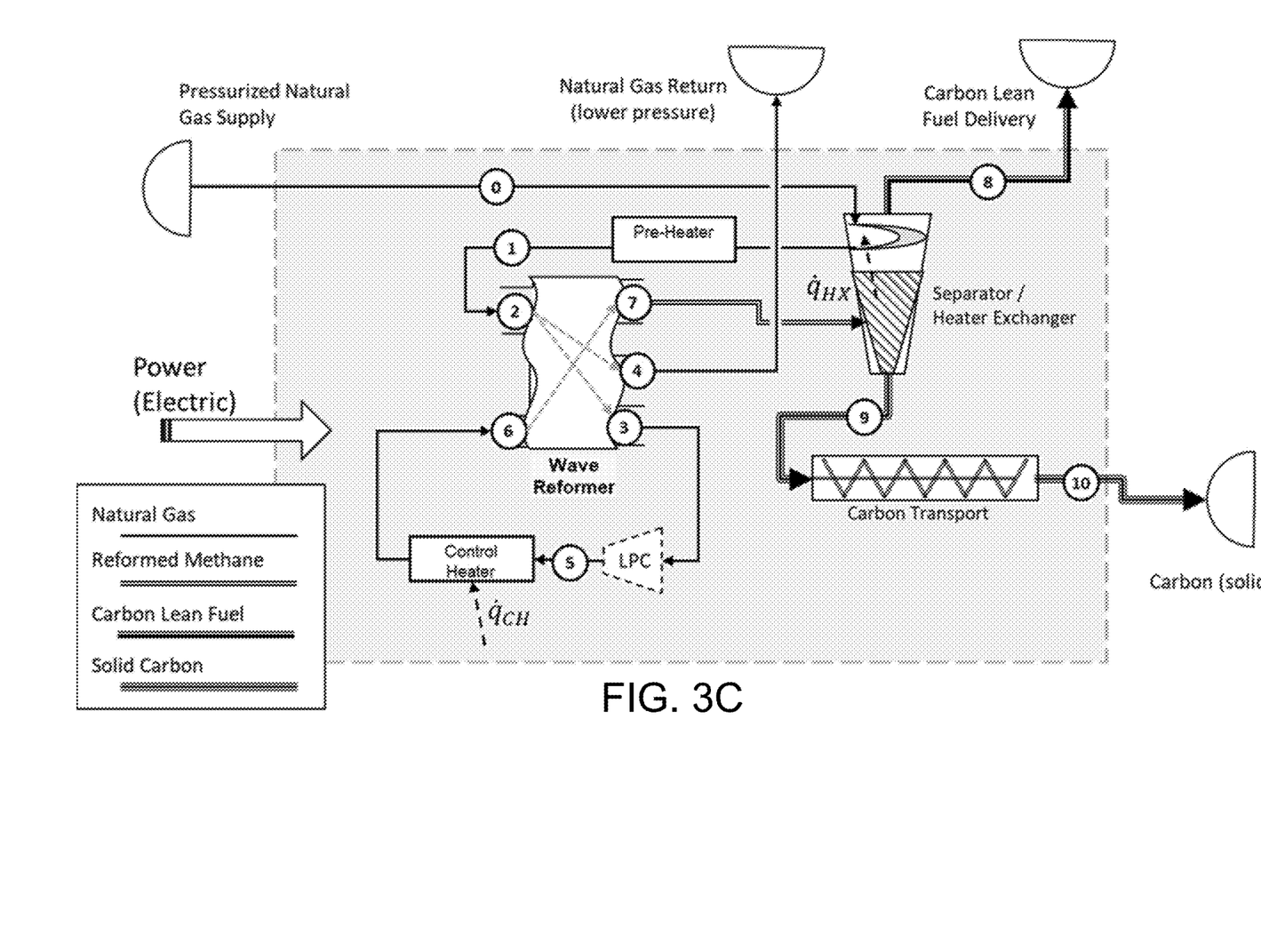
FIG. 3C is a schematic of an open loop wave reforming system embodiment.

FIG. 3C is a more specific embodiment of an open loop hydrocarbon fluid reformer using a wave reformer. Specifically, a schematic of an open-loop wave reformer system for pressurized natural gas is shown FIG. 3C. The system model described here is based on this schematic. The model includes all the components inside the dashed box, which is the control volume for the model. The schematic shows the mass flows that cross the control volume boundaries at states 0 (fuel inflow), 4 (lower-pressure natural gas), 8 (carbon-lean fuel outflow) and 10 (carbon black outflow). It also shows electric power crossing the control volume. this is the energy input required to drive the Low-Pressure Compressor (LPC), Carbon Transport (CT) and Wave Reformer (WR). The power required for each component is determined as part of the system modeling.

The system model calculates the thermodynamic state of the fluid at each of the indicated state points, 0 through 10. To accomplish this task, it is necessary to assume the performance of each component. Additionally, the working fluid is simplified from natural gas, which is about 95% methane, to 100% methane. This was done for simplicity as the model was developed. The use of the REFPROP package allows for conversion to a representative natural gas mixture with little to no other model changes. A complete list of model assumptions is presented below:

The model assumes a 24-hour day
The incoming fuel stream is 100% methane
The methane decomposes, or cracks, into only hydrogen and solid carbon
The compression processes use 90% isentropic efficiency
The heat exchangers have a gas 5% pressure drop and a thermal efficiency of 90%
The mixing and splitting junctions have a 3% pressure drop and are adiabatic
The solid particle separation process has a 15% pressure drop on the gas side
The solid particles exit the separator at atmospheric pressure
The fuel supply is delivered at 31 bar (450 psia) and 273 K (59° F.)
The NIST REFPROP v9.1 property package is used for fluid properties
The NASA Chemical Equilibrium with Application (CEA) equilibrium chemistry model to determine thermal cracking As shown in FIG. 3C, the fuel inflow (state 0) is routed to a regenerator where it picks up heat from the high-temperature carbon lean fuel. The partially heated fuel (state 1) is further heated by the pre-heater which is fueled using the carbon lean fuel. The pre-heated flow (state 2) is routed to the wave reformer high-pressure duct. This flow is expanded on-board the wave reformer and routed to the wave reformer low-pressure exhaust ducts, one which feeds the recirculation loop (state 3) and one which is routed back to the primary system at a lower pressure (state 4). There is no reformed or high-temperature fuel routed to the recirculation loop, so carbon build up is not anticipated.

The recirculation loop is heated to a predetermined temperature and routed to the low-pressure inlet duct of the wave reformer (state 6). This is the fuel that will be reformed on-board the wave reformer. This fuel is then routed out the wave reformer high-pressure exhaust duct (state 7) which feeds the solid/gas separator. The flow from the separator is then delivered to its end use location. An overview of each of the state points on the schematic is given in Table 2 below.

TABLE 2

SWR System Flow Diagram State Point Description

| # | Description | Notes |
|---|---|---|
| 0 | Methane (Natural Gas) Supply | |
| 1 | Methane Pre-Heat A | The methane is preheated using the heat content in the hot gas cracked products |
| 2 | Methane Pre-Heat B | The methane is further preheated using the carbon-lean fuel for energy |
| 3 | Low Pressure Re-circulation Loop Outflow | |
| 4 | Low Pressure Exhaust | |
| 5 | Control Heater Inflow | This stream is the inflow to the control heater, which is included in the low-pressure recirculation loop. The control heater sets the temperature of the fuel to be reformed to the appropriate value as it enters the wave reformer. |
| 6 | Low Pressure Wave Reformer Inflow | This stream is the low pressure warm fuel to be reformed onboard the wave reformer |
| 7 | High Pressure Wave Reformer Outflow | This stream is the high-pressure high-temperature reformed fuel which is routed to the solid carbon separator |
| 8 | Reformed Gas Outflow | This stream is the reformed gas stream exiting the separator, thus the solids have been separated out. It is the carbon lean fuel that will be delivered to the end user |
| 9 | Solid Carbon Outflow | This stream is the solid carbon stream exiting the separator. This stream is feed the solid carbon transport system |
| 10 | Solid Carbon Delivery to Storage | Conveyor belt transport to storage or delivery |

Figure 3D:
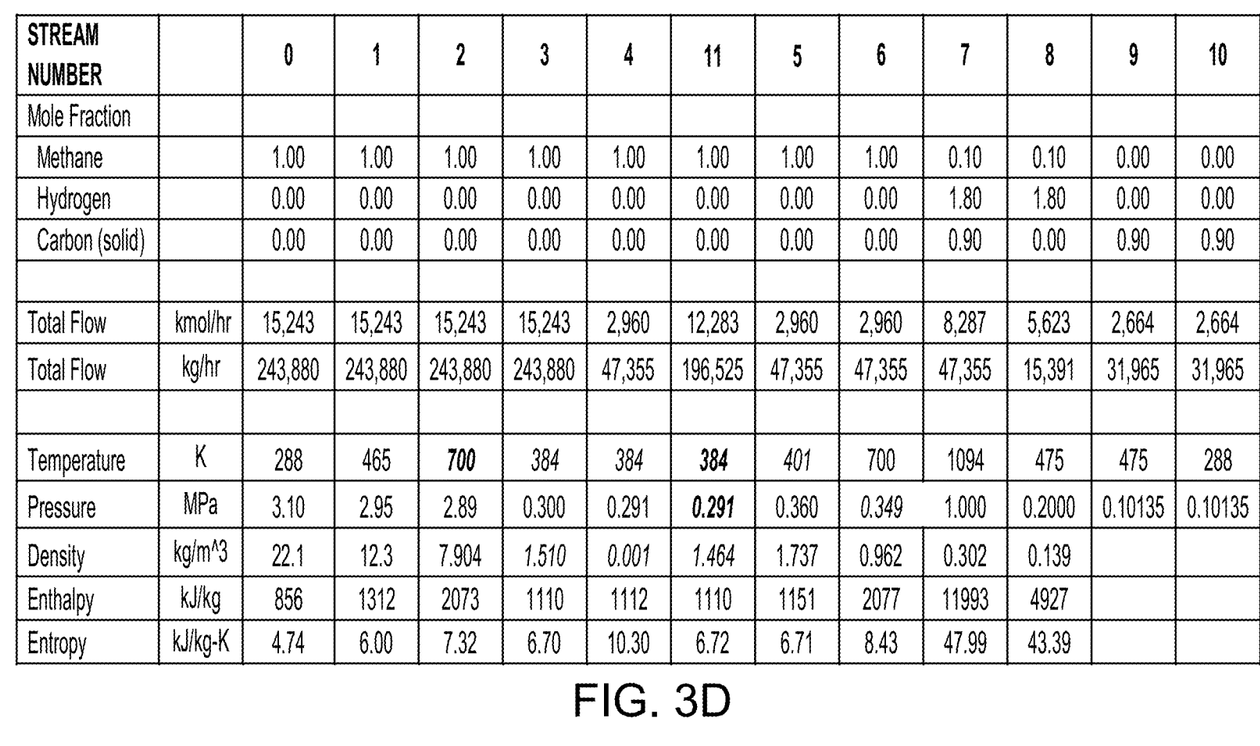
FIG. 3D is a chart of data measured at state points for an open loop wave reforming system.

A summary stream table is presented in FIG. 3D, the stream numbers correspond to the locations shown on the schematic and defined in the table above. Data is presented for each state point 1 through 10 of the open loop system.

Other Examples

An example of a reformer system with less parts is illustrated in FIG. 1. The system shown is a three-port wave reformer with at least one inlet port, 31, 32, and at least one outlet port, 33, 34. The 31, 32, inlet port is fed by a pressurized fluid source with a working fluid that may, or may not, release energy onboard the rotor. The working fluid then undergoes a process onboard the rotor where the fluid is split into two flows, a higher energy stream and a lower energy stream and exhausted from at least one outlet port, 33, 34. The location and size of each of these inlet and outlet ports may be changed in system design.

Other Embodiments

Referring to FIG. 5, wave rotors have been used in connection with using pressure waves to heat fluids such as hydrogen. A pressure wave reformer is a type of wave rotor that, in accordance with the embodiments described, can reform heavy hydrocarbon fluids into lighter hydrocarbon fluids, including hydrogen and solid carbon. In some embodiments the hydrocarbon fluid to be reformed is methane gas. That methane gas sourced from fluid supply 100 in FIG. 2B is brought into the pressure wave reformer 30 via wave reformer inflow port 31. The fluid being introduced may or may not have a catalyst, such as carbon-based solids, iron-based catalysts, or nickel-based catalysts, included to aid the reforming process and it may be passed through a pre-heater 20 before being fed into the wave reformer 30.

In one demonstration of an embodiment, the methane supplied to pre-heater 20 is at roughly 288° K and 3.1 MPa. The methane gas leaves that pre-heater at roughly 700° K and 2.9 MPa, entering the pressure wave reformer 30 at that pressure and temperature. The methane gas enters flow channels (not shown but represented by the channels 84 of the wave rotor of FIG. 5) formed in the pressure wave rotor 30.

A second fluid source is also supplied to the pressure wave reformer 30 in some embodiments. That second fluid can be a different fluid, such as an argon gas, or the same hydrocarbon fluid, or in some embodiments, methane gas. In embodiment that use a second fluid source, that second fluid source may be a fluid, taken from the pressure wave reformer 30 via outflow port 34, and recirculated. In one demonstration of an embodiment, the fluid taken from outflow port 34 was partly decomposed methane (some portion of which is hydrogen) and unreformed methane and other possible hydrocarbons. Depending on the operating temperature and pressure ranges utilized, some of this recirculated fluid can be a carbon-rich partially decomposed hydrocarbon. The recirculated fluid may be a gas or some combination of gas and liquid and carbon.

In one embodiment, the recirculated fluid leaves the outflow port 34 at about 384° K and 0.3 MPa. In this embodiment, the recirculated fluid, can be re-heated and compressed by recirculation heater 40 and fan/compressor 50 and reintroduced into the pressure wave reformer via inflow port 32. In one demonstration of this embodiment, the recirculated fluid re-enters the pressure wave reformer at roughly 700° K and 0.349 MPa.

The two fluids are carried onboard the reformer for the period of time required for the reforming process. The introduction into the wave reformer of two fluids at different pressures causes shock waves within the pressure wave reformer 30. Pressure waves are formed by varying the pressure at the ends of the channels using the ports, or closing off the ends of the channels using the walls of the end-plates as the rotor rotates. Shock waves form inside the wave reformer 30. It is these resulting shock waves that cause expansion and compression waves within the reformer that significantly increase fluid temperatures and drive the reformation process. The reformed fluid is extracted from the pressure wave reformer 30 via outflow port 33 and collected or gathered.

Reforming of the driven hydrocarbon occurs when the temperature/pressure in the reforming region reach sufficient levels to change the molecular structure of the hydrocarbon fluid. In one demonstration of an embodiment of the invention, this fluid exits the wave reformer 30 at roughly 1094° K and 1.0 MPa. Depending on the objective, the fluid leaving the pressure wave reformer 30 through port 33 may be a lighter hydrocarbon, partially unreformulated hydrocarbon, a carbon-rich hydrocarbon or, in the case of one embodiment, hydrogen fluid combined with a carbon solid, including for example, carbon black, or other carbon-rich product such as carbon nanotubes or nanodiamonds. As shown in FIG. 2B, the fluid exiting through port 33 can be routed to a settling chamber 60 to facilitate further decomposition and separation of any particulate from the decomposed fluid. The carbon by-products created may be collected/harvested and sold.

In some embodiments, the pressure source is a mechanically pressurized source, from a combustion, from phase change process onboard the rotor, or some combination of these. Additionally, the wave reformer can be designed to input energy to the flow (wave-compressor), extract energy from the flow (wave-turbine) or to minimize the shaft power required (wave-rotor). Because the pressure waves occurring onboard the wave reformer are doing the work, the energy necessary to drive the wave reformer of the present invention is reduced or minimized. The channels, formed by the vanes within the rotor (which are for example, straight, curved or other shapes), run the entire axial length of the rotor.

The generation of the carbon by-products of the exemplary processes creates a secondary revenue stream for the system owner and significantly increases the system return on investment. This is in direct contrast to capturing carbon dioxide and then paying to compress and/or sequester that waste gas such as in steam methane reforming The pressure wave reformer of the exemplary embodiments is for example an axial or radial type wave rotor. The wave reformer of some embodiments is 6 inches in diameter and about 18 inches long for a flow rate on the order of 0.5 lb/s. The wave rotor itself is scalable, with flow rates on the order of 1000 lb/s or higher using a wave rotor on the order of 42 inches long and 48 inches in diameter.

The hydrocarbon wave reformer has unique properties that facilitate continuous, efficient and scalable hydrocarbon thermal decomposition with or without a catalyst. The wave reformer is a "cold wall" reformer where (part or all of) the energy for heating comes from the supply pressure of the fluid being used to drive the process, which, in a some embodiments, can be the fluid being reformed. Because the fluids being reformed flow through the reformer, the reformer itself does not overheat (hence the "cold wall" designation). In some embodiments, the supply pressure, which is generally throttled to a low operating pressure, is not leveraged as in conventional reforming operations, and contributes to the wave reformer's superior overall efficiency over those methods.

While exemplary embodiments have been presented in the foregoing detailed description, it should be appreciated that a vast number of variations exist. It should also be appreciated that the exemplary embodiments are only examples, and are not intended to limit the scope, applicability, or configuration of the described embodiments in any way. Rather, the foregoing detailed description will provide those skilled in the art with a convenient road map for implementing the exemplary embodiments. It should be understood that various changes can be made in the function and arrangement of elements and method steps without departing from the scope as set forth in the appended claims and the legal equivalents thereof.

I claim:

1. A method of employing a wave rotor to reform a hydrocarbon fluid into a hydrogen fluid and solid particulate, the method comprising the steps of:
   providing a wave rotor having one or more fluid inlet ports and one or more fluid outlet ports;
   introducing a supply of hydrocarbon fluid at a first pressure to said wave rotor through one of said inlet ports of said wave rotor;
   introducing a supply of a fluid at a pressure different than said hydrocarbon fluid supply first pressure to said wave rotor through one of said inlet ports of said wave rotor;

using pressure waves in one or more stages of compression or expansion to reform some or all of the hydrocarbon fluid supplied within said wave rotor into said hydrogen fluid and solid particulates; and exhausting the hydrogen and any partially reformed hydrocarbon fluid from said wave rotor through said at least one outlet port.

2. The method of claim 1 wherein the hydrocarbon fluid being reformed is one or more of the following: methane, ethylene, biogas.

3. The method of claim 1 further comprising the step of separating the solid particulate from the hydrogen and partially unreformed hydrocarbon fluid.

4. The method of claim 3 wherein the solid particulate is one or more of the following: carbon black; nanotubes; and nanodiamonds.

5. The method of claim 1 wherein the reforming step includes using pressure waves within said wave rotor to reform some or all of the hydrocarbon fluid.

6. The method of claim 1 further comprising the step of providing a heat exchanger to heat the supply of hydrocarbon fluid prior to being introduced to said wave rotor.

7. The method of claim 6 further comprising directing the hydrogen fluid, along with any partially reformed hydrocarbon fluid, from said at least outlet port of the wave rotor and passing into a settling chamber.

8. The method of claim 7 further comprising the step of providing a regenerative heat exchanger to heat the incoming supply of fluid at said different pressure, said regenerative heat exchanger using heat of said partially reformed hydrocarbon fluid, hydrogen fluid or the solid particulate as a heat source.

9. The method of claim 7 wherein said settling chamber thermally and/or catalytically further decomposes any said partially reformed hydrocarbon fluid.

10. The method of claim 1 further comprising the step of providing a reaction catalyst to said hydrocarbon fluid supply prior to supplying said hydrocarbon fluid to said wave rotor.

11. The method of claim 1 wherein the fluid supplied to said wave rotor at the pressure different than said hydrocarbon fluid supply first pressure and said hydrocarbon fluid supply are introduced into said wave rotor through the same one or more fluid inlet ports.

12. The method of claim 1 wherein the fluid supplied to said wave rotor at the pressure different than said hydrocarbon fluid supply first pressure and said hydrocarbon fluid supply are introduced into said wave rotor through separate fluid inlet ports.

13. The method of claim 1 wherein said fluid supplied to said wave rotor at a pressure different than said hydrocarbon fluid supply pressure is a hydrocarbon fluid.

14. The method of claim 13 further comprising the step of recirculating a portion of the hydrogen fluid, partially unreformed hydrocarbon and solid particulate from the at least one outlet port of said wave rotor and supplying said recirculated portion back to one of said at least one inlet ports of said wave rotor and further comprising the step of providing one or more fans or compressors for pressurizing the recirculated portion prior to being reintroduced to said wave rotor through one of said at least one inlet ports.

15. The method of claim 14 further comprising using one or more control heaters for providing additional heat to the recirculated portion prior to being reintroduced to said at least one inlet port.

16. The method of claim 1 wherein the wave rotor has:
an axis and an axial length, an inner and an outer wall, said inner and outer walls together forming an annular space within said wave rotor, and a plurality of rotor vanes that connect the wave rotor inner and outer walls and serve to divide said annular space within said wave rotor into a plurality of wave rotor channels;
an annular wave rotor inlet end plate having the one or more fluid inlet ports, each inlet port receiving the supply of hydrocarbon fluid and sequentially aligning with said channels formed within said wave rotor as said rotor rotates about a wave rotor axis permitting flow of the hydrocarbon fluid into said wave rotor channels; and
an annular wave rotor outlet end plate having the one or more fluid outlet ports, said one or more outlet ports connected and sequentially aligning with said channels formed within said wave rotor as said rotor rotates about said wave rotor axis permitting flow of hydrogen fluid and solid particulate out of said wave rotor channels.

17. A process of using a wave rotor to decompose a hydrocarbon fluid into a hydrogen fluid and carbon particulate, the process comprising the steps of:
providing a wave rotor having at least one fluid inlet port and at least one fluid outlet port;
introducing a supply of hydrocarbon fluid at a first pressure to one of said inlet ports of said wave rotor;
introducing a second supply of fluid at a second pressure to one of said inlet ports of said wave rotor, said second hydrocarbon fluid pressure being greater than the pressure of said hydrocarbon fluid supply;
using pressure waves in one or more stages of compression or expansion to reform some or all of the hydrocarbon fluid supplied into said hydrogen fluid and said carbon particulate;
collecting the hydrogen fluid and carbon particulate from said wave rotor through said at least one outlet port; and
separating the solid carbon particulate from the hydrogen fluid.

18. The process of claim 17 wherein the wave rotor has:
an axis and an axial length, an inner and an outer wall, said inner and outer walls together forming an annular space within said wave rotor, and a plurality of rotor vanes that connect the wave rotor inner and outer walls and serve to divide said annular space within said wave rotor into a plurality of wave rotor channels;
an annular wave rotor inlet end plate having the at least one fluid inlet port, each inlet port receiving the supply of hydrocarbon fluid and sequentially aligning with said channels formed within said wave rotor as said rotor rotates about a wave rotor axis permitting flow of the hydrocarbon fluid into said wave rotor channels; and
an annular wave rotor outlet end plate having the at least one fluid outlet port, said at least one outlet port connected and sequentially aligning with said channels formed within said wave rotor as said rotor rotates about said wave rotor axis permitting flow of hydrogen fluid and solid particulate out of said wave rotor channels.

19. A system for decomposing a hydrocarbon fluid into a hydrogen fluid and a solid particulate, the system comprising:
a radial wave rotor having an axis and an axial length, an inner and an outer wall, said inner and outer walls together forming an annular space within said wave rotor, and a plurality of rotor vanes that connect the wave rotor inner and outer walls and serve to divide said annular space within said wave rotor into a plurality of wave rotor channels;

a supply of hydrocarbon fluid at a first pressure;

an annular wave rotor inlet end plate having at least one inlet port, each inlet port connected to said hydrocarbon fluid source at a first pressure and sequentially aligning with said channels formed within said radial wave rotor as said rotor rotates about said wave rotor axis permitting flow of hydrocarbon fluid into said wave rotor channels;

an annular wave rotor outlet end plate having at least one outlet port, said at least one outlet port connected and sequentially aligning with said channels formed within said radial wave rotor as said rotor rotates about said rotor axis permitting flow of hydrogen fluid and solid particulate out of said wave rotor channels;

a motor to cause said waver rotor to rotate;

a supply of a driver fluid at a second pressure, said second pressure being different that than said first pressure, said driver fluid passing through said at least one inlet port to enter at least one of said plurality of wave rotor channels containing said hydrocarbon fluid at said first pressure, wherein a pressure difference between said hydrocarbon fluid and said driver fluid within said wave rotor channel creates pressure waves to reform at least a portion of the hydrocarbon fluid into the hydrogen fluid and solid particulate.

20. The system of claim 19 wherein the hydrocarbon fluid being reformed is one or more of the following: methane; ethylene and biogas.

21. The system of claim 19 wherein the solid particulate is one or more of the following: carbon black; nanotubes; and nanodiamonds.

22. The system of claim 19 wherein the driver fluid is a hydrocarbon.

23. The system of claim 19 wherein said first pressure is in the range of 0.5 MPa and said second pressure is in the range of 3.0 MPa.

24. The method of claim 19 wherein said wave rotor channels extend the axial length of said wave rotor.

25. A method for employing a wave rotor for reforming a hydrocarbon fluid, the method comprising:

providing a wave rotor having at least one inlet and at least one outlet;

introducing at least one hydrocarbon fluid to be reformed to said wave rotor through said at least one inlet; and using pressure waves in one or more stages of compression or expansion to reform some or all of the hydrocarbon fluid introduced into a hydrogen fluid and solid particulates.

26. The method of claim 25 further comprising the step of removing a portion of the reformed fluid from said at least one wave rotor outlet and recirculating said removed portion to said wave rotor through said at least one inlet.

27. The method of claim 26 further comprising the step of using one or more fans or compressors to pressurize said removed portion of said reformed fluid prior to recirculating said removed portion back to said at least one wave rotor inlet.

28. The method of claim 26 further including the step of introducing a reaction catalyst to said hydrocarbon fluid prior to introduction of said hydrocarbon fluid to said wave rotor.

29. The method of claim 25 wherein the wave rotor has:
an axis and an axial length, an inner and an outer wall, said inner and outer walls together forming an annular space within said wave rotor, and a plurality of rotor vanes that connect the wave rotor inner and outer walls and serve to divide said annular space within said wave rotor into a plurality of wave rotor channels;

an annular wave rotor inlet end plate having the at least one inlet, each inlet receiving the hydrocarbon fluid and sequentially aligning with said channels formed within said wave rotor as said rotor rotates about a wave rotor axis permitting flow of the hydrocarbon fluid into said wave rotor channels; and an annular wave rotor outlet end plate having the at least one outlet, said at least one outlet connected and sequentially aligning with said channels formed within said wave rotor as said rotor rotates about said wave rotor axis permitting flow of the hydrogen fluid and the carbon particulate out of said wave rotor channels.

30. The method of claim 25 wherein the solid particulates are comprised of carbon.

31. A method of employing a wave rotor to reform a hydrocarbon fluid into a hydrogen fluid and solid particulate, the method comprising the steps of:

providing a wave rotor having one or more fluid inlet ports and one or more fluid outlet ports;

introducing a supply of hydrocarbon fluid at a first pressure to said wave rotor through one of said fluid inlet ports of said wave rotor;

introducing a supply of a fluid at a pressure different than said hydrocarbon fluid supply first pressure to said wave rotor through one of said fluid inlet ports of said wave rotor;

using pressure waves in more than one stage of compression or more than one stage of expansion to reform some or all of the hydrocarbon fluid supplied within said wave rotor into said hydrogen fluid and solid particulates; and exhausting the hydrogen fluid and solid particulates and any partially reformed hydrocarbon fluid from said wave rotor through one of said fluid outlet port.

32. The method of claim 31 wherein the hydrocarbon fluid being reformed is one or more of the following: methane, ethylene, biogas.

33. The method of claim 31 further comprising the step of separating the solid particulate from the hydrogen and partially unreformed hydrocarbon fluid.

34. The method of claim 33 wherein the solid particulate is one or more of the following: carbon black; nanotubes; and nanodiamonds.

35. The method of claim 31 wherein the reforming step includes using pressure waves within said wave rotor to reform some or all of the hydrocarbon fluid.

36. The method of claim 31 further comprising the step of providing a heat exchanger to heat the supply of hydrocarbon fluid prior to being introduced to said wave rotor.

37. The method of claim 36 further comprising directing the hydrogen fluid and solid particulates, along with any partially reformed hydrocarbon fluid, exhausted from said one of said fluid outlet port of the wave rotor into a settling chamber.

38. The method of claim 37 further comprising the step of providing a regenerative heat exchanger to heat the incoming supply of fluid at said different pressure, said regenerative heat exchanger using heat of said partially reformed hydrocarbon fluid, hydrogen fluid or the solid particulate as a heat source.

39. The method of claim 37 wherein said settling chamber thermally and/or catalytically further decomposes any of said partially reformed hydrocarbon fluid.

40. The method of claim 31 further comprising the step of providing a reaction catalyst to said hydrocarbon fluid supply prior to supplying said hydrocarbon fluid to said wave rotor.

41. The method of claim 31 wherein the fluid supplied to said wave rotor at the pressure different than said hydrocarbon fluid supply first pressure and said hydrocarbon fluid are introduced into said wave rotor through the same one or more fluid inlet ports.

42. The method of claim 31 wherein the fluid supplied to said wave rotor at the pressure different than said hydrocarbon fluid supply first pressure and said hydrocarbon fluid supply are introduced into said wave rotor through separate fluid inlet ports.

43. The method of claim 31 wherein said fluid supplied to said wave rotor at a pressure different than said hydrocarbon fluid supply pressure is a hydrocarbon fluid.

44. The method of claim 43 further comprising the step of recirculating a portion of the hydrogen fluid, partially unreformed hydrocarbon and solid particulate from said one of said fluid outlet ports of said wave rotor and supplying said recirculated portion back to one of said one or more fluid inlet ports of said wave rotor, and a further the step of providing one or more fans or compressors for pressurizing the recirculated portion prior to being reintroduced to said wave rotor through one of said one or more fluid one inlet ports.

45. The method of claim 44 further comprising using one or more control heaters for providing additional heat to the recirculated portion prior to reintroducing the recirculated portion to one of said one or more fluid inlet ports.

\* \* \* \* \*